United States Patent [19]

Tanaka et al.

[11] Patent Number: 5,432,566
[45] Date of Patent: Jul. 11, 1995

[54] VIDEO CIRCUIT CONTROLLING BRIGHTNESS AND/OR SATURATION

[75] Inventors: Yasushi Tanaka; George Fang, both of Nagaokakyo; Hitoshi Hashinaga, Amagasaki, all of Japan

[73] Assignee: Mitsubishi Denki Kabishiki Kaisha, Tokyo, Japan

[21] Appl. No.: 190,540

[22] Filed: Feb. 2, 1994

[30] Foreign Application Priority Data

Apr. 27, 1993 [JP] Japan ................... 5-101139

[51] Int. Cl.⁶ .............................................. H04N 5/57
[52] U.S. Cl. ........................... 348/687; 348/645
[58] Field of Search ............... 348/687, 688, 673, 703, 348/649, 712, 671, 648, 647, 645; H04N 5/57

[56] References Cited

U.S. PATENT DOCUMENTS 4,980,756 12/1990 Lagoni ........................... 348/687 X
4,982,287 1/1991 Lagoni ........................... 348/687 X
5,191,427 3/1993 Hwang ............................. 348/687
5,200,829 4/1993 Lagoni ........................... 348/687 X
5,291,295 3/1994 Srivastava ....................... 348/687
5,294,986 3/1994 Tsuji et al. ...................... 348/672

FOREIGN PATENT DOCUMENTS 556053 8/1993 Japan .

Primary Examiner—Victor R. Kostak

[57] ABSTRACT

A video circuit provided with corrective control data generator which generates respective control data for correcting and controlling the brightness and/or saturation of the picture displayed on a display unit in accordance with the average brightness level of the luminance signal separated from the video signal. The brightness and/or saturation of the picture are thus corrected and controlled on the basis of the corrective control data.

41 Claims, 8 Drawing Sheets

SYNC SIGNAL
TRANSMISSION RATE-CORRECTED PULSE

VIDEO CIRCUIT CONTROLLING BRIGHTNESS AND/OR SATURATION

BACKGROUND OF THE INVENTION

1. Field of the Invention

The present invention relates to a video circuit, or more particularly to a video circuit for compensating for the deterioration of picture details of a low luminance signal in the case where a high luminance signal and a low luminance signal are mixed.

2. Description of Related Art

FIG. 1 is a block diagram showing a conventional video circuit.

A composite video signal such as a television signal is separated into a chrominance signal and a luminance signal at a Y/C separator circuit 101. The chrominance signal is supplied to a video signal processing circuit 102 and the luminance signal to a DC transmission rate correction circuit 103. The DC transmission rate correction circuit 103 compensates for the deterioration of the details of the video signal of a low-luminance signal, and is operated so that a pulse signal having an amplitude corresponding to that of an average luminance level is extracted from the luminance signal, is added to the luminance signal and is supplied to the video signal processing circuit 102 as a transmission rate-corrected luminance signal. The video signal processing circuit 102 generates three primary color signals from the transmission rate-corrected luminance signal and the chrominance signal and applies it to a CRT 104.

Generally, in the case where a high-brightness signal is generated at more than a predetermined ratio with respect to a low-brightness signal by the camera imaging process, the total quantity of light is corrected by the "aperture". As a result, when such a signal is received, a phenomenon called "black deterioration" develops in which the video portion of a low-brightness signal is deteriorated in black. This is because the pedestal level of the video signal is moved toward dark side. Historically several suggestions have been made to cope with this problem.

The DC transmission rate correction circuit 103 is well known and shown in the block diagram, which constitutes a part of a bipolar IC designed for processing the luminance system signal for the video signal. The luminance signal is supplied to an APL (Average Picture Level) detector 131 and a transmission rate corrector 133. The APL detector 131 removes the horizontal sync signal portion of the inputted luminance signal, which is smoothed to an average luminance signal level by a resistor and a capacitor (not shown) connected to the transmission rate correction terminal 132. The resulting signal is supplied to a transmission rate corrector 133. The transmission rate corrector 133 generates a transmission rate-correction pulse having an amplitude corresponding to that of the average brightness level signal. The transmission rate-corrected pulse thus generated is added to the back porch of the pedestal level of the luminance signal supplied to the transmission rate corrector 133 thereby to produce a transmission rate-corrected luminance signal, which is supplied through an output buffer 134 to the video signal processing circuit 102.

FIG. 2 is a diagram showing a waveform of the transmission rate-corrected luminance signal. The level of the bottom section of the transmission rate-corrected pulse is processed to function as a pedestal level in the video signal processing circuit 102. As a result, the larger the amplitude of the transmission rate-corrected pulse, the brighter the luminosity of the screen is corrected for reproducing the image details of a low-brightness signal.

As described above, according to the conventional video circuit, the transmission rate-corrected pulse is added to the back porch, which is so close to the sync signal that the separation thereof is difficult, thereby sometimes causing an unstable synchronization. Also, the conventional DC transmission rate correction circuit 103 is operated to affect correction in such a direction as to attain an even higher screen luminosity, the higher the brightness of a signal.

When the luminosity of the CRT 104 exceeds a predetermined level, an excessive current flows in the CRT 104. This causes an excessive load on the high-voltage generator and damages the horizontal output transistor. In order to prevent this malfunction, the video signal processing circuit 102 includes an automatic brightness limiter which detects the change in the current of the CRT 104 and, when it is excessive, the current of the CRT 104 is limited to below a specified value by a negative feedback. When the current in the CRT 104 is reduced excessively, the automatic brightness limiter regulates the CRT 104 in such a manner as to increase the current thereof. There occurs a time lag due to the increase or decrease in the current of the CRT 104 as a result of the negative feedback. When the brightness change is abrupt causing abrupt correction, the automatic brightness limiter is likely to over compensate, followed by excessive relaxation, thereby causing current oscillation on the CRT 104.

In addition, the transmission rate-corrected luminance signal is correspondingly determined by the circuit constants of the DC transmission rate correction circuit 103. Therefore, the correction characteristics of color saturation cannot be set. As a consequence, the correction of the brightness level is liable to cause insufficient color saturation correction.

SUMMARY OF THE INVENTION

An object of the invention is to provide a video circuit capable of correcting the luminosity and color saturation of the screen without causing any oscillatory condition of the CRT current or unstable synchronization by generating control data on the basis of an average brightness level and by corrective controlling on the basis of the control data.

Another object of the invention is to provide a video circuit which exhibits the same effect as the one described above even for a laterally-long picture (hereinafter referred to as "a long sideways picture") larger than 4:3 in aspect ratio lacking image at the upper and lower parts or a picture with sub titles or text information.

A video circuit according to the invention comprises means for generating control data for correcting and controlling the luminosity and/or the color saturation of the display picture by the average brightness level of the luminance signal separated from the video signal and a video signal processing circuit for correcting and controlling the luminosity and/or the color saturation of the display image on the basis of the control data. The resulting lack of luminosity correction at the pedestal level of the luminance signal causes no CRT current oscillation nor an unstable synchronization. Further, the luminosity and/or the color saturation are corrected to avoid insufficient color saturation.

Also, the video circuit according to the invention has a correction amount of zero for other than a predetermined brightness range. As a consequence, the oscillation of the CRT current is prevented which otherwise might be caused by the correction made in an unrequired range.

Further, in the video circuit according to the invention, a masking signal is generated for masking the luminance signal, so that while the luminance signal is masked, for example, while the luminance signal is displayed at the upper or lower part of the display means, the average brightness is held to the level that has been detected immediately before. Thus, even for the long sideways picture or a picture with sub titles, the luminosity and color saturation of the screen can be corrected without the luminance signal free of picture being involved in the control data.

Furthermore, the average brightness level providing the foundation for generating a correction control data is determined as an average of multiple fields. This makes it possible to damp the variations in average brightness level and prevent the unstable synchronization.

In addition, the video circuit according to the invention is configured to transmit the control data during the vertical blanking period. As a result, it does not interfere with the video signal in the effective video signal time.

The above and further objects and features of the invention will more fully be apparent from the following detailed description with accompanying drawings.

DESCRIPTION OF THE PREFERRED EMBODIMENTS

The invention will be described below with reference to the drawings showing an embodiment thereof.

Figure 1:
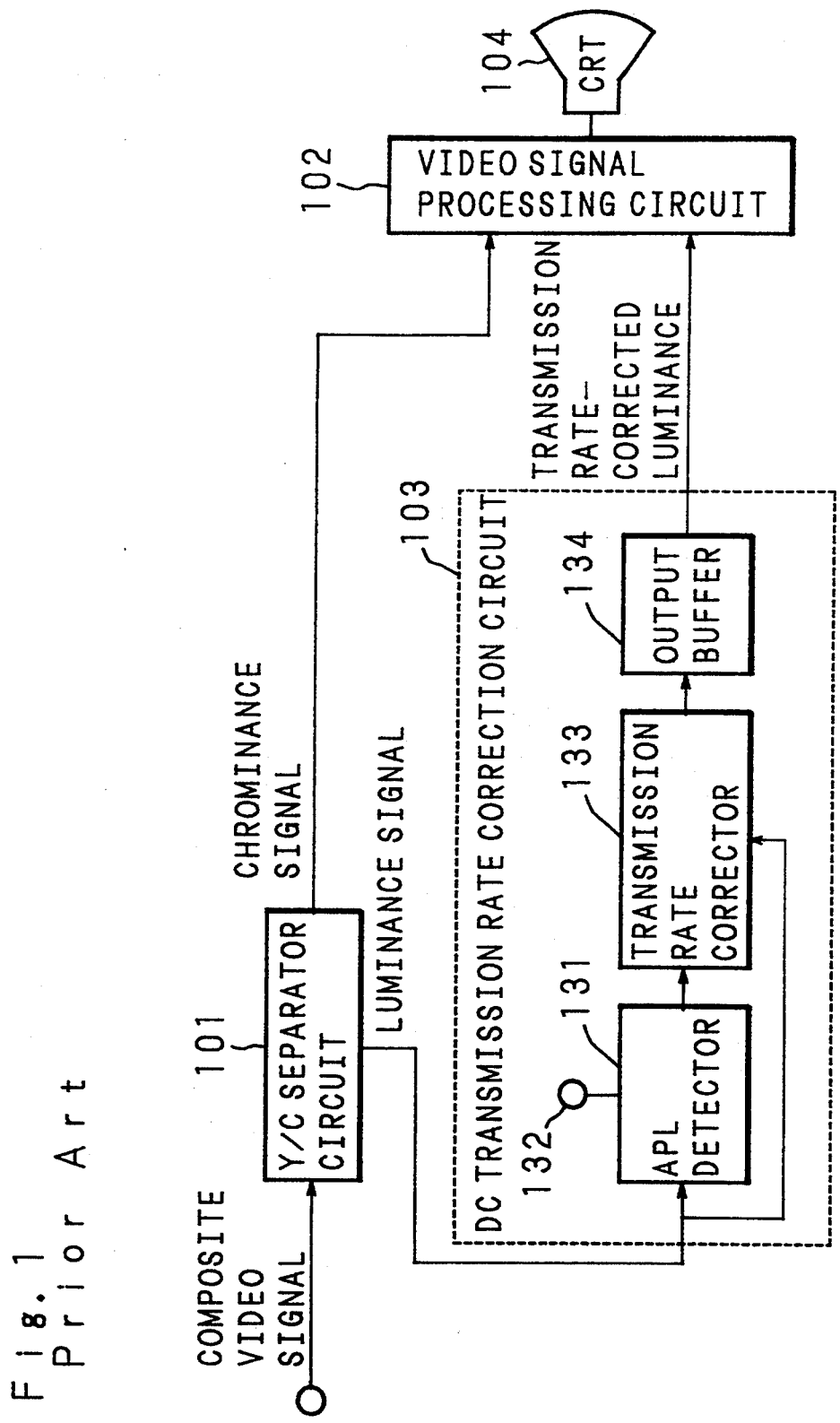
FIG. 1 is a block diagram showing a conventional video circuit.
Figure 2:
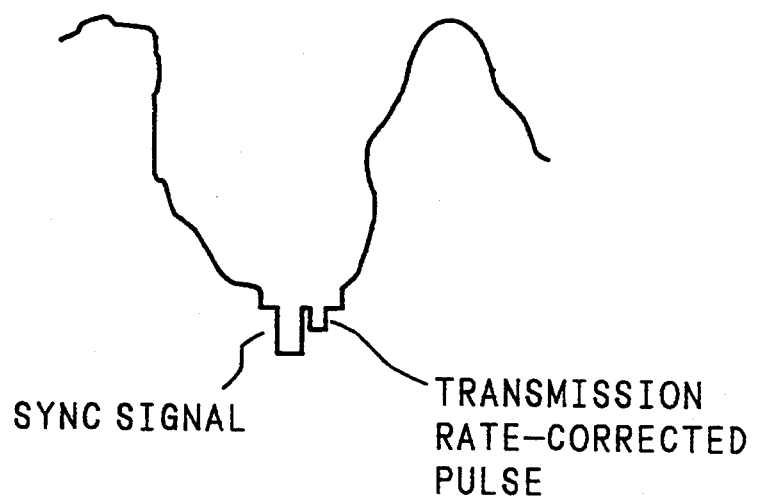
FIG. 2 is a diagram showing a waveform of an output signal of the transmission rate corrector shown in FIG. 1.
Figure 3:
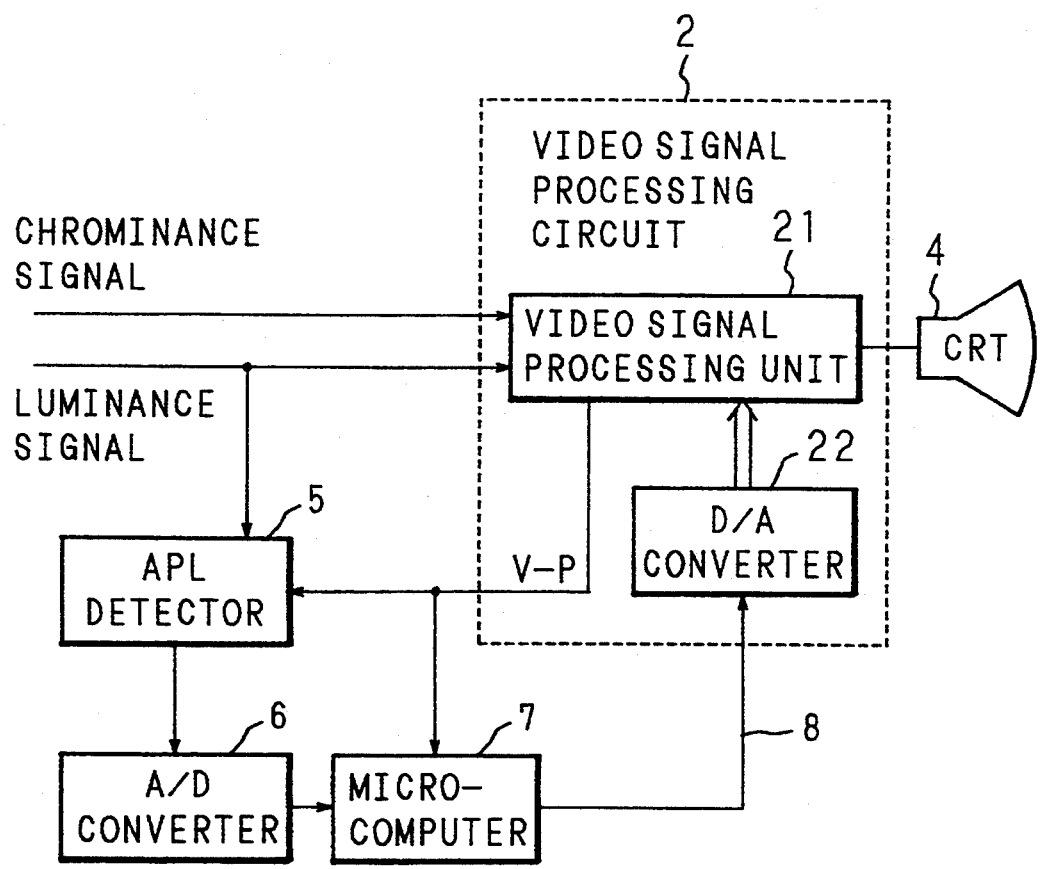
FIG. 3 is a block diagram showing a configuration of a video circuit according to the invention.

A block diagram of a configuration of the invention is shown in FIG. 3. A composite video signal such as a television signal is separated into the chrominance signal and the luminance signal by a Y/C separator circuit (not shown). The chrominance signal is supplied to a video signal processing unit 21 of a video signal processing circuit 2. The video signal processing unit 21 produces a vertical blanking pulse V-P.

The luminance signal is supplied to an APL circuit for detecting an average brightness level (hereinafter referred to as "APL") and the video signal processing unit 21. The APL signal detected and produced by the APL circuit 5 is A/D-converted by an A/D converter 6 and supplied to a microcomputer 7. The vertical blanking pulse V-P produced from the video signal processing unit 21 is supplied to the APL circuit 5 as a signal for securing synchronization to generate an APL signal on the one hand and is supplied to the microcomputer 7 as a signal for securing synchronization to generate control data on the other hand.

The control data for controlling the luminosity and saturation of the screen generated by the microcomputer on the basis of the APL signal is supplied to the D/A converter 22 of the video signal processing circuit 2, through a bus line 8, and is further supplied to the video signal processing unit 21. The video signal processing unit 21 generates the three primary color signals from the chrominance signal, the luminance signal and the control data, then applies them to the CRT 4.

Figure 4:
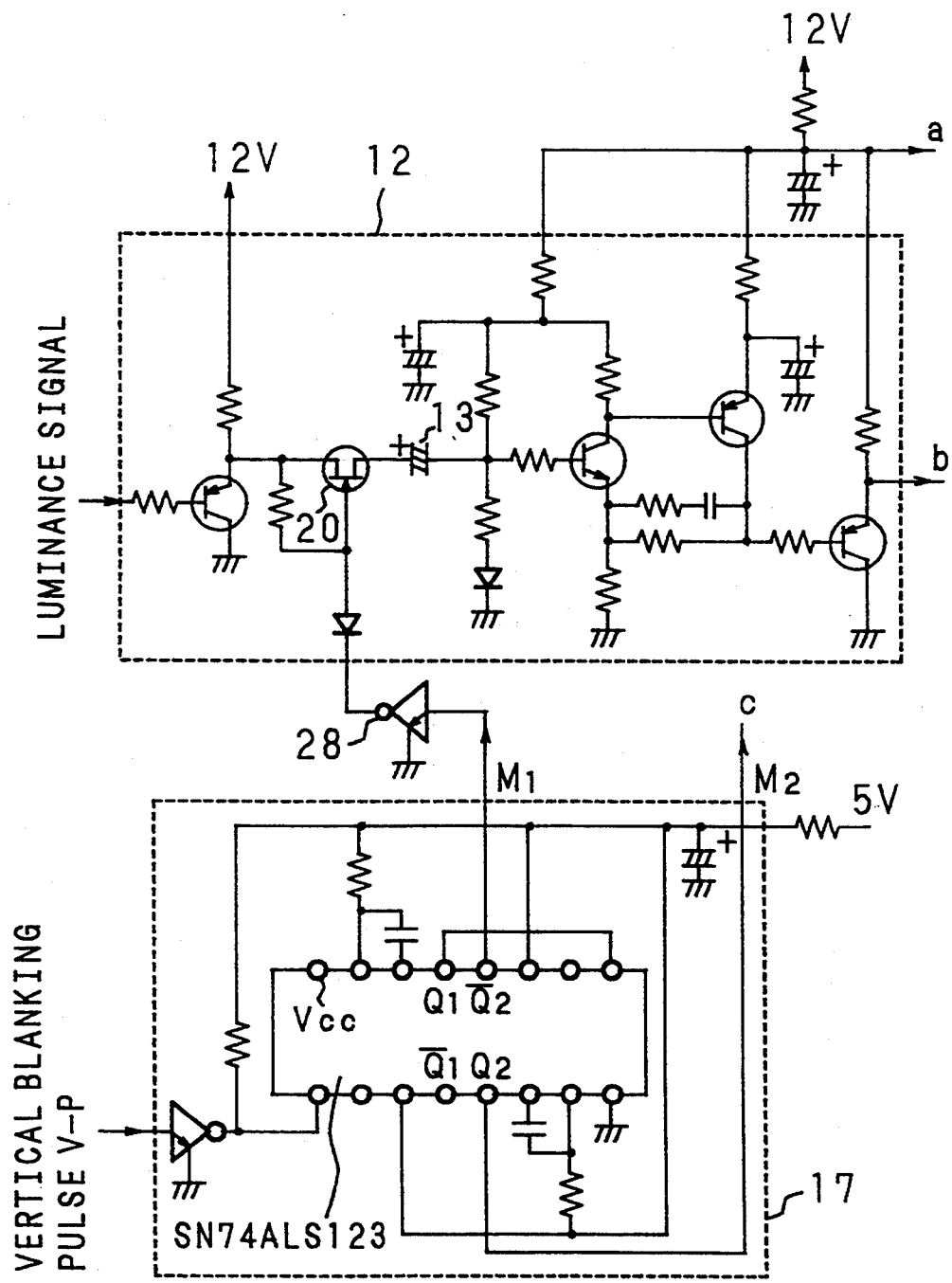
FIG. 4 is a block diagram showing an APL circuit shown in FIG. 3.
Figure 5:
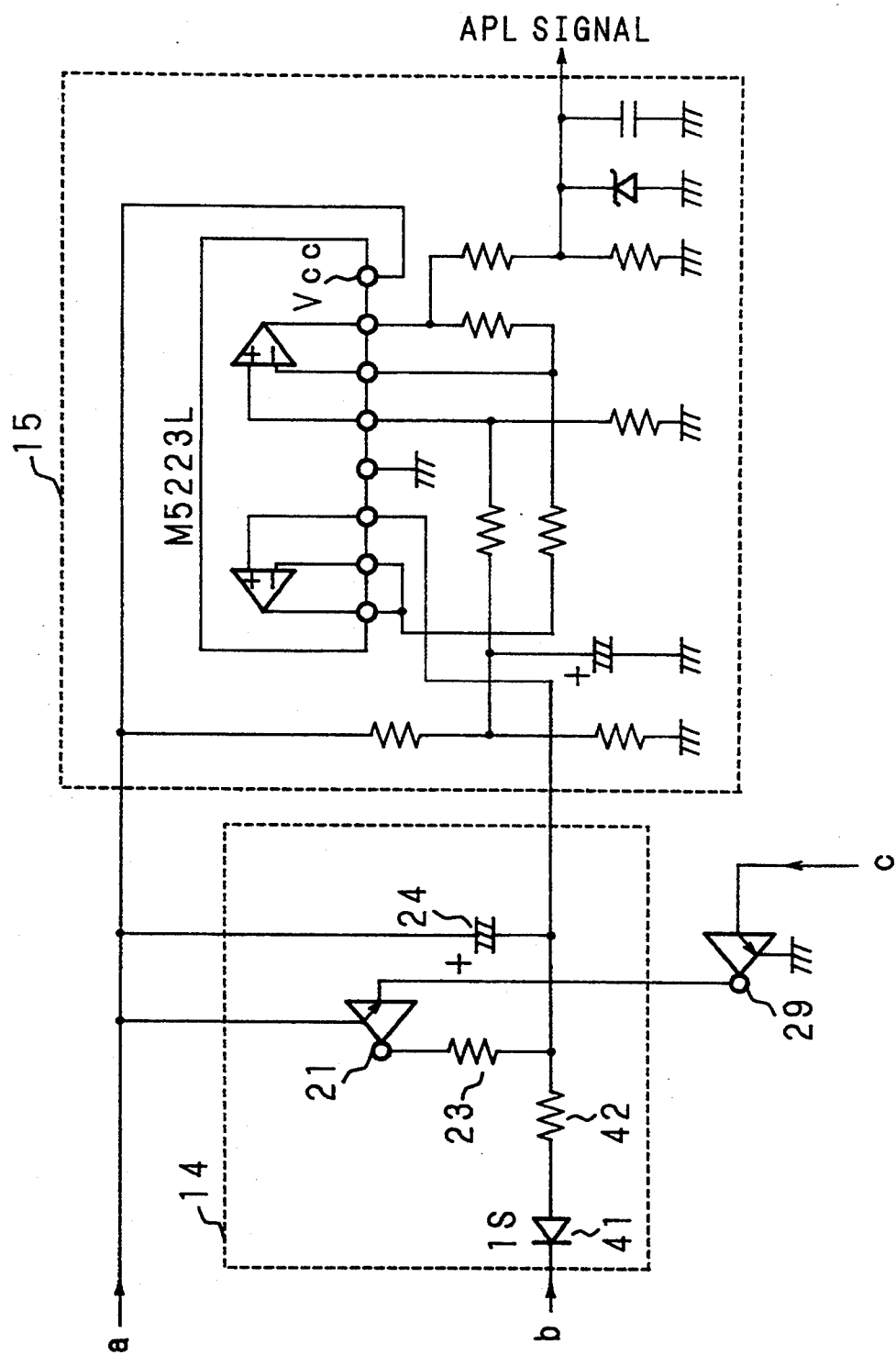
FIG. 5 is a block diagram showing an APL circuit shown in FIG. 3.

FIGS. 4 and 5 are block diagrams showing the APL circuit 5 shown in FIG. 3.

The luminance signal is amplified at a luminance signal amplifier circuit 12, the peak thereof is detected at a peak detector circuit 14, the level thereof is received by a level converter circuit 15 to be translated to a level suitable for A/D conversion, and is produced as an APL signal. A masking signal generator circuit 17 generates two masking signals $M_1$, $M_2$ for masking a part of the screen on the basis of the vertical blanking pulse V-P supplied thereto, and applies them through two masking signal supply switches 28, 29 to the luminance signal amplifier circuit 12 and the peak detector circuit 14.

The masking signals $M_1$, $M_2$ are signals for masking the luminance signal for a predetermined period of time. Some examples of application are when the television signal is received, when characters or the like are displayed at the upper or lower part of the CRT screen, and in case of a long sideways picture lacking an image at the upper and lower parts. In each of these cases, the parts involved are required to be masked since an APL signal received from the luminance signal corresponding to the upper and lower parts of the screen is meaningless.

Figure 6:
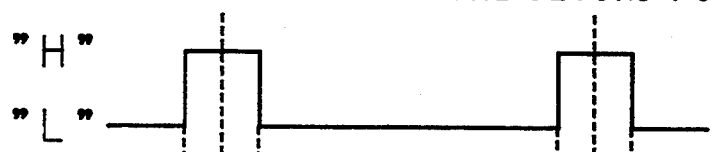
FIG. 6 is a diagram showing waveforms of the two masking signals shown in FIG. 3.
Figure 6:
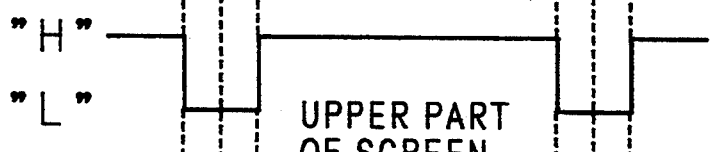

FIG. 6 shows waveforms of the masking signals $M_1$, $M_2$. The masking signals $M_1$, $M_2$ are signals of complementary type with the polarities thereof reversed to each other. In FIG. 6, the ordinate represents the level of the masking signals $M_1$, $M_2$ and the abscissa the lapse of time. In FIG. 6, the length of time between a near mid-point b of the first pulse and a near mid-point of the second pulse represents one field. The time point corresponding to the front displacement point of the first pulse is denoted by a, and the back displacement point by c. The time point at the front displacement point of the second pulse is denoted by d, and that at the back displacement point by f. The time length between b and c is the one when the upper part of the screen is masked in the field period, and the time length between d and e the one when the lower part of the screen is masked.

The luminance signal for one vertical scanning period supplying to the luminance signal amplifier circuit 12, is impedance matched, then passed through video switch 20, a coupling capacitor 13, and an amplifying unit all in series, before entering the peak detector circuit 14. The masking signal $M_1$ is supplied to the luminance signal amplifier circuit 12 through a switch 28, and the masking signal $M_2$ to the peak detector circuit 14 through a switch 29. The video switch 20 is turned off when the masking signal $M_1$ is at "H" level, and turned on when the masking signal $M_1$ is at "L" level. The coupling capacitor 13 operates in such a way that the DC bias value of the amplifying unit in the next stage assumes the average value of the video signal.

The peak detector circuit 14 has a diode 41 and a resistor 42 interposed between the input and output terminals thereof, and has a discharge resistor 23 in series with a time-constant changing switch 21 and a capacitor 24 connected between the output terminal thereof and a 12-V power supply. The luminance signal for a plurality of horizontal scanning periods supplied to the peak detector circuit 14 is such that the tip end of the sync signal thereof is clamped at the negative terminal of the capacitor 24 through a diode 41 and a resistor 42. In the case of a high-brightness signal, the amplitude of the luminance signal is so large that the voltage clamped by the capacitor 24 is considerably distant from the power supply voltage and approaches ground voltage. As a result, the output of the peak detector circuit 14 represents variations in APL. The masking signal $M_2$ is supplied to the time-constant changing switch 21 through the switch 29. The time-constant changing switch 21 is turned off when the masking signal $M_2$ is at "L" level, and turned on when the masking signal $M_2$ is at "H" level.

When the masking signal $M_2$ is at "L" level, the time-constant changing switch 21 turns off. Therefore, the discharge resistor 23 "floats", and the charges associated with the peak value of the luminance signal stored in the capacitor 24 are not substantially released. Thus the capacitor 24 operates in such a manner as to hold the peak value of the luminance signal at a level immediately before the masking signal $M_2$ turns to "L" level. When the masking signal $M_2$ is at "H" level, on the other hand, the time-constant changing switch 21 turns on, so that the charge at the peak value of the luminance signal clamped by the capacitor 24 is released in accordance with the time constant determined by the capacitor 24 and the discharge resistor 23. The capacitor 24 thus is prepared for detection of APL for the next one vertical scanning period.

Now, explanation will be made about the operation for detecting the APt with reference to FIGS. 4 and 5.

At the beginning part and end part of one field period, the masking signal $M_1$ is at "H" level, and the masking signal $M_2$ at "L" level. The video switch 20 of the luminance signal amplifier circuit 12 turns off, and the coupling capacitor 13 holds the average value of the immediately-preceding luminance signal. The time-constant changing switch 21 of the peak detector circuit 14 turns off and holds the immediately-preceding peak value.

During the middle part of one field period, the masking signal $M_1$ is at "L" level and the masking signal $M_2$ at "H" level. The video switch 20 of the luminance signal amplifier circuit 12 turns on. The luminance signal is amplified with the average value thereof as a DC bias value, becomes a signal representing the APL through the peak detector circuit 14, then converted by a level changing circuit 15 to a level suitable for A/D conversion, and is outputted as an APL signal. Furthermore, during the first or second half time of the field period, i.e., during the time when the upper or lower part of the screen is masked, the peak value held in the peak detector circuit 14 from the immediately-preceding unmasked time is translated in level and outputted as the APL signal.

Figure 7:
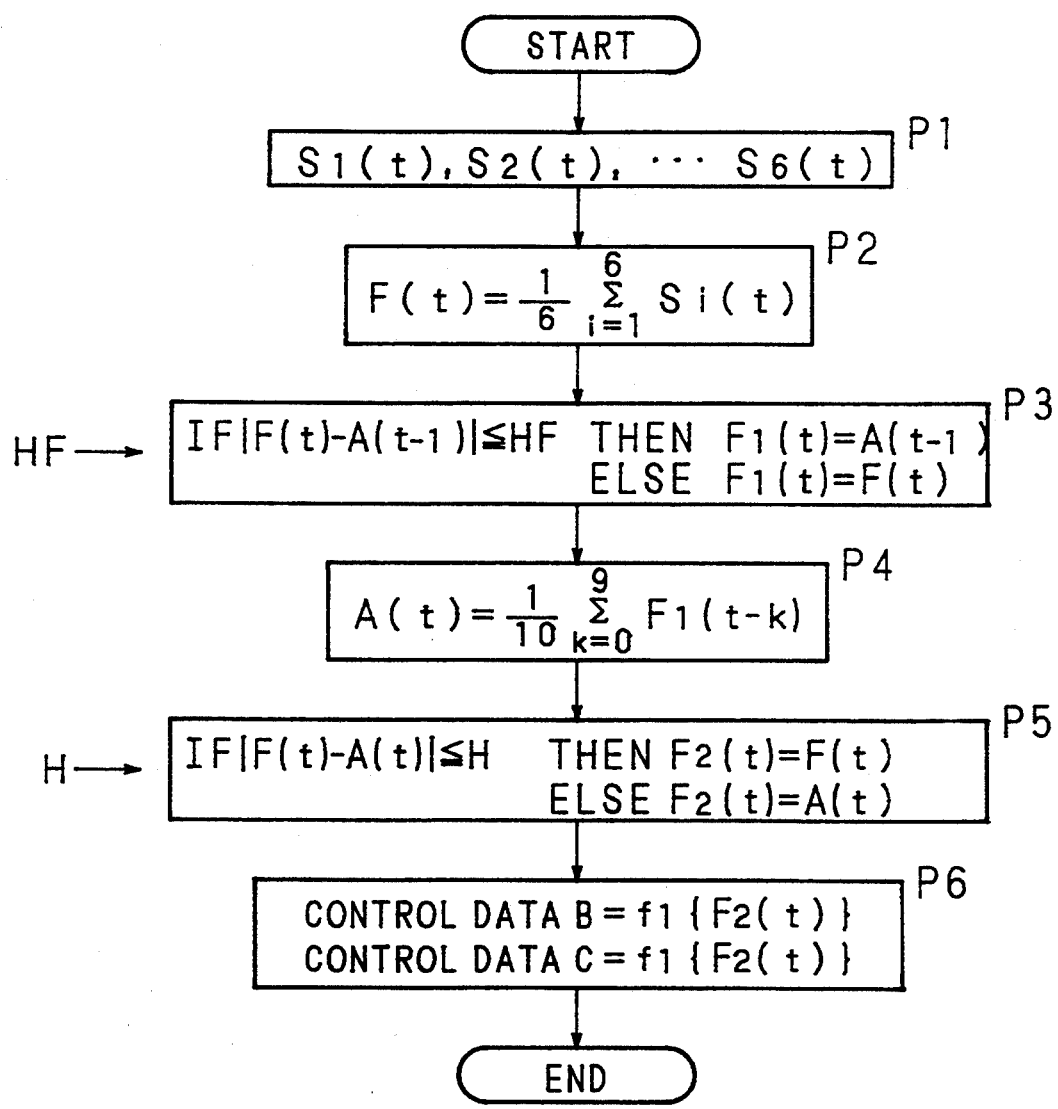
FIG. 7 is a flowchart of a microcomputer shown in FIG. 3.

FIG. 7 is a flowchart showing the procedures for generating control data by the microcomputer 7 shown in FIG. 3 from the final APL data in which the APL data is corrected. In FIG. 7, character t designates an ordinal number showing the sequence of fields, i an ordinal number showing the sequence of the sampling data of the APL signal in one field, and k, a loop variable used for averaging the data of a multiple number of successive fields.

The variable t is incremented by the vertical blanking pulse V-P. The data obtained by A/D converting the APL signal are samples at six points for each field (step P1). Next, the six APL data S (t), S (t), ... S (t) thus sampled are averaged to obtain an average APL data F(t) (step P2).

$|F(t)-A(t-1)|$ is compared with a threshold value HF. In the case where $|F(t)-A(t-1)| \leq HF$, F (t)=A(t-1) is assumed. When $|F(t)-A(t-1)| > HF$, on the other hand, F (t)=F(t) is assumed.

The value F (t) is obtained for the corrected average APL data point (the threshold HF is set to remove the minor variations of the APL signal) (step P3).

The average value A(t) for ten successive F (t) is obtained (step P4). This A(t) is used as A(t−1) again in the next field.

$|F(t)-A(t)|$ is compared with the threshold value H. In the case where $|F(t)-A(t)| \leq H$, F (t)=F(t) is assumed, and when $|F(t)-A(t)| > H$, F (t)=A(t) is assumed to produce the final APL data F (t). In the process, the threshold H, together with the threshold value HF, is set in order to prevent flickers on the screen (step P6).

The final APL data F (t) thus obtained contains no sharp variation components of luminance. As a result, the control data generated on the basis of F (t) does not contain sharp variations either, thereby preventing the flicker.

In the next step, the control data B for controlling the "luminosity" representing the degree of brightness and the control data C for controlling the "saturation" representing the degree of color saturation, are generated on the basis of F (t). The control data D is generated as a function f {F (t)}, and the control data C as a function f {F (t)} (step P6).

Figure 8:
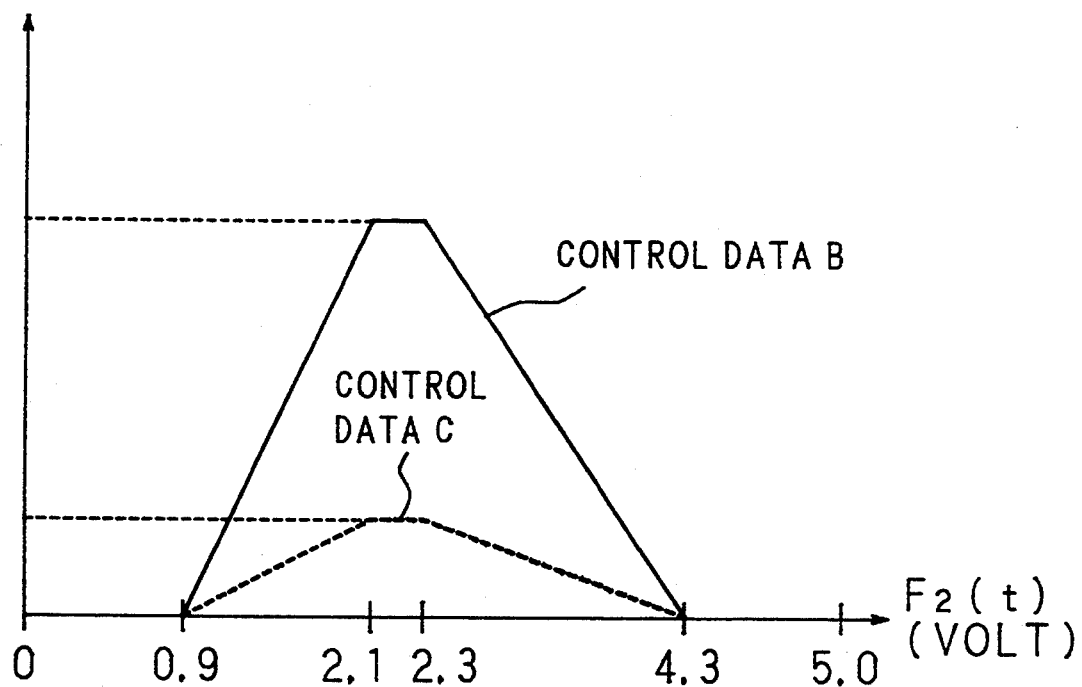
FIG. 8 is a diagram showing the relationship between the finally-produced APL data and the two control data shown in FIG. 7.

FIG. 8 is a graph showing the relationship between the control data B, C and F (t) shown in FIG. 7. The F (t) value on the abscissa indicates that the maximum value is 5 V and the picture level is 100% (white), and that the minimum value is 0 V and the picture level is 0% (black). The value of the control data B on the ordinate means the amount of brightness control. The brightness on the screen is adjusted by changing the value of the brightness-adjusting step on the brightness-adjusting variable resistor of the video signal processing unit 21. The amount of brightness control is the quantity added to the value of the brightness-adjusting step. The value of the control data C on the ordinate indicates the amount of saturation control. The screen saturation is adjusted by changing the value of the saturation-adjusting step on the saturation-adjusting variable resistor of the video signal processing unit 21. The amount of saturation control is the one added to the value of the saturation-adjusting step.

For the F (t) of 2.1 V to 2.3 V, the quantity of the control data B and C both assume a maximum value. The reason is that the details of a low-brightness signal are reproduced for the control data B and the saturation shortage for reproduction of the details of a low-brightness signal is corrected for the control data C.

For the F (t) value from 0 V to 0.9 V and from 4.3 V to 5 V, the amount of control of the control data B and C are both zero. The reason is that correction is unnecessary in the inherently dusky scene such as in twilight, and so is for the bright portion of a high-contrast scene, and that the oscillatory state in which the CRT current repetitively increases and decreases is prevented. The saturation need not of course be corrected unless the brightness is corrected.

For the F (t) value from 0.9 V to 2.1 V, the control amount of the control data B and C increases linearly, and the control amount of the control data B and C linearly decreases for the F (t) value from 2.3 V to 4.3 V. This is to avoid a sharp change in the control amount at the middle part between the parts to be corrected and not corrected in lightness and saturation.

For the F (t) from 0.9 V to 4.3 V, the control amount of saturation is set to a value lower than the control amount of brightness. This is to correct the saturation shortage due to the brightness correction and thus to reproduce the original signal faithfully.

The control data B, C may be created as correlated fixed data from F (t).

The control data B, C are transmitted to the D/A converter 22 for D/A conversion from the bus line 8 during the vertical blanking period, and then are supplied to the video signal processing unit 21 (See FIG. 3). The brightness and saturation are thus controlled in combination thereby to reproduce the details of a low-brightness signal.

In this way, brightness is not corrected by the correction of the pedestal level, and therefore no sync instability occurs. Also, since the control data B, C are transmitted during the vertical blanking period, the data is not changed during the effective video signal time and the video signal processed is not interfered with. Further, the control data B, C may be transmitted during the vertical blanking period together with other video processing information.

Although the video signal processing circuit 2 is composed of the video signal processing unit 21 and the D/A converter 22 in the embodiment, the D/A converter 22 may be assembled in the video signal processing unit 21 integrally as a video signal processing unit 2.

As described above, according to the invention, the brightness and saturation of a display image are corrected on the basis of the brightness and saturation correction data prepared from the average brightness level. Since the conventional transmission rate-corrected pulse is not used, there is no possibility of causing a sync instability. Also, the saturation may be corrected at the time of brightness correction. Further, the corrective control data involves zero amount of correction outside a predetermined range (a high-brightness scene containing a low-brightness area), and therefore the electric current of the display unit does not oscillate.

Furthermore, since the average brightness level is detected in the middle of one field, details of the low-brightness area are reproducible in a high-brightness image and saturation shortage due to brightness correction is prevented at the same time.

In addition, according to the embodiment, the average brightness level providing the basis for preparing the corrective control data is calculated as an average of a multiple number of fields. The sharp variations, therefore, are removed to obtain a flicker free picture.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A video circuit comprising:
   displaying means for displaying a picture on the basis of a video signal;
   means for determining an average brightness level of a luminance signal separated from said video signal and generating control data for correctively controlling the brightness of said picture displayed on said display means in accordance with the average brightness level thus determined; and
   a video signal processing circuit for correctively controlling the brightness of said picture on the basis of said control data
   wherein said control data generating means includes
   means for generating the control data for reducing the amount of brightness correction of said picture to zero in the case where said average brightness level is out of a predetermined range.

2. A video circuit comprising:
   displaying means for displaying a picture on the basis of a video signal;
   means for determining an average brightness level of a luminance signal separated from said video signal and generating control data for correctively controlling the brightness of said picture displayed on said display means in accordance with the average brightness level thus determined; and
   a video signal processing circuit for correctively controlling the brightness of said picture on the basis of said control data wherein said control data generating means includes
   a circuit for generating a masking signal for masking said luminance signal for a predetermined time of one field period; and
   a detector circuit for detecting said average brightness level while said luminance signal is not masked and holding the last-detected average brightness level while said luminance signal is masked.

3. A video circuit comprising:
   displaying means for displaying a picture on the basis of a video signal;
   means for determining an average brightness level of a luminance signal separated from said video signal and generating control data for correctively controlling the brightness of said picture displayed on said display means in accordance with the average brightness level thus determined; and
   a video signal processing circuit for correctively controlling the brightness of said picture on the basis of said control data wherein said control data generating means includes
   a circuit for generating a masking signal to mask said luminance signal corresponding to picture displayed in the upper and lower parts of said display means; and
   a detector circuit for detecting said average brightness level while said luminance signal is not masked and holding the last-detected average brightness level while said luminance signal is masked.

4. A video circuit comprising:
displaying means for displaying a picture on the basis of a video signal;
means for determining an average brightness level of a luminance signal separated from said video signal and generating control data for correctively controlling the brightness of said picture displayed on said display means in accordance with the average brightness level thus determined; and
a video signal processing circuit for correctively controlling the brightness of said picture on the basis of said control data wherein said control data generating means includes
means for determining multiple number of average brightness levels in one field and producing an average value per field by further averaging said average brightness levels;
means for determining an average value of multiple number of fields by taking an average value from the respective average values per field of multiple number of successive field;
means for comparing the difference between said average value per field and said average value of multiple number of fields with a predetermined value; and
means for selecting either said average value per field or said average value of multiple number of fields as data for generating control data in accordance with the result of comparison.

5. A video circuit comprising:
displaying means for displaying a picture on the basis of a video signal;
means for determining an average brightness level of a luminance signal separated from said video signal and generating control data for correctively controlling the brightness of said picture displayed on said display means in accordance with the average brightness level thus determined; and
a video signal processing circuit for correctively controlling the brightness of said picture on the basis of said control data wherein said control data generating means includes
means for determining multiple number of average brightness levels in one field and producing an average value per field by further averaging said average brightness levels;
means for determining an average value of multiple number of fields by taking an average value from the respective average values per field of multiple number of successive fields;
means for comparing the difference between said average value per field and said average value of multiple number of fields within a first predetermined value;
means for producing a selected value by selecting either said average value per field or said average value of multiple number of fields in accordance with the result of comparison;
means for producing a selected average value by averaging said selected values of multiple number of successive fields;
means for comparing the difference between said average value per field and said selected average value with a second predetermined value; and
means for selecting either said average value per field or said selected average value as data for generating the control data according to the result of comparison.

6. A video circuit according to claim 1, wherein said control data generating means includes;
means for transmitting said control data from said control data generating means to said video signal processing circuit during the vertical blanking period.

7. A video circuit comprising:
displaying means for displaying a picture on the basis of a video signal;
means for determining an average brightness level of the luminance signal separated from said video signal and generating control data for correctively controlling the saturation of said picture displayed on said display means in accordance with the average brightness level determined; and
a video signal processing circuit for correctively controlling the saturation of said picture on the basis of said control data wherein said control data generating means includes
means for generating the control data for reducing the amount of saturation correction of said picture to zero in the case where said average brightness level is out of a predetermined range.

8. A video circuit comprising:
displaying means for displaying a picture on the basis of a video signal;
means for determining an average brightness level of the luminance signal separated from said video signal and generating control data for correctively controlling the saturation of said picture displayed on said display means in accordance with the average brightness level determined; and
a video signal processing circuit for correctively controlling the saturation of said picture on the basis of said control data wherein said control data generating means includes
a circuit for generating a masking signal for masking said luminance signal for a predetermined time of one field period; and
a detector circuit for detecting said average brightness level while said luminance signal is not masked and holding the last-detected average brightness level while said luminance signal is masked.

9. A video circuit comprising:
displaying means for displaying a picture on the basis of a video signal;
means for determining an average brightness level of the luminance signal separated from said video signal and generating control data for correctively controlling the saturation of said picture displayed on said display means in accordance with the average brightness level determined; and
a video signal processing circuit for correctively controlling the saturation of said picture on the basis of
said control data wherein said control data generating means includes
a circuit for generating a masking signal to mask said luminance signal corresponding to picture displayed in the upper and lower parts of said display means; and
a detector circuit for detecting said average brightness level while said luminance signal is not masked and holding the last-detected average brightness level while said luminance signal is masked.

10. A video circuit comprising:

displaying means for displaying a picture on the basis of a video signal;

means for determining an average brightness level of the luminance signal separated from said video signal and generating control data for correctively controlling the saturation of said picture displayed on said display means in accordance with the average brightness level determined; and a video signal processing circuit for correctively controlling the saturation of said picture on the basis of said control data wherein said control data generating means includes means for determining multiple number of average brightness levels in one field and producing an average value per field by further averaging said average brightness levels;

means for determining an average value of multiple number of fields by taking an average value from the respective average values per field of multiple number of successive fields;

means for comparing the difference between said average value per field and said average value of multiple number of fields within a predetermined value; and means for selecting either said average value per field or said average value of multiple number of fields as data for generating the control data in accordance with the result of comparison.

11. A video circuit comprising:

displaying means for displaying a picture on the basis of a video signal;

means for determining an average brightness level of the luminance signal separated from said video signal and generating control data for correctively controlling the saturation of said picture displayed on said display means in accordance with the average brightness level determined; and a video signal processing circuit for correctively controlling the saturation of said picture on the basis of said control data wherein said control data generating means includes means for determining multiple number of average brightness levels in one field and producing an average value per field by further averaging said average brightness levels;

means for determining an average value of multiple number of fields by taking an average value from the respective average values per field of multiple number of successive fields;

means for comparing the difference between said average value per field and said average value of multiple number of fields within a first predetermined value;

means for producing a selected value by selecting either said average value per field or said average value of multiple number of fields in accordance with the result of comparison;

means for producing a selected average value by averaging said selected values of multiple number of successive fields;

means for comparing the difference between said average value per field and said selected average value with a second predetermined value; and means for selecting either said average value per field or said selected average value as data for generating the control data according to the result of comparison.

12. A video circuit according to claim 7, wherein said control data generating means includes;

means for transmitting said control data from said control data generating means to said video signal processing circuit during the vertical blanking period.

13. A video circuit comprising:

displaying means for displaying a picture on the basis of a video signal;

means for determining an average brightness level of the luminance signal separated from said video signal and generating control data for correctively controlling the brightness of said picture displayed on said display means in accordance with the average brightness level thus determined;

means for generating control data for correctively controlling the saturation of said picture displayed on said display means in accordance with the average brightness level; and a video signal processing circuit for correctively controlling the brightness and saturation of said picture on the basis of said two control data wherein said control data generating means includes:

means for generating the control data for reducing the amount of brightness correction of said picture to zero in the case where said average brightness level is out of a predetermined range.

14. A video circuit comprising:

displaying means for displaying a picture on the basis of a video signal;

means for determining an average brightness level of the luminance signal separated from said video signal and generating control data for correctively controlling the brightness of said picture displayed on said display means in accordance with the average brightness level thus determined;

means for generating control data for correctively controlling the saturation of said picture displayed on said display means in accordance with the average brightness level; and a video signal processing circuit for correctively controlling the brightness and saturation of said picture on the basis of said two control data wherein said control data generating means includes means for generating the control data for reducing the amount of saturation correction of said picture to zero in the case where said average brightness level is out of a predetermined range.

15. A video circuit comprising:

displaying means for displaying a picture on the basis of a video signal;

means for determining an average brightness level of the luminance signal separated from said video signal and generating control data for correctively controlling the brightness of said picture displayed on said display means in accordance with the average brightness level thus determined;

means for generating control data for correctively controlling the saturation of said picture displayed on said display means in accordance with the average brightness level; and a video signal processing circuit for correctively controlling the brightness and saturation of said picture on the basis of said two control data wherein said control data generating means includes a circuit for generating a masking signal for masking said luminance signal for a predetermined time of one field period; and a detector circuit for detecting said average brightness level while said luminance signal is not masked and holding the last-detected average brightness level while said luminance signal is masked.

16. A video circuit comprising:

displaying means for displaying a picture on the basis of a video signal;

means for determining an average brightness level of the luminance signal separated from said video signal and generating control data for correctively controlling the brightness of said picture displayed on said display means in accordance with the average brightness level thus determined;

means for generating control data for correctively controlling the saturation of said picture displayed on said display means in accordance with the average brightness level; and a video signal processing circuit for correctively controlling the brightness and saturation of said picture on the basis of said two control data wherein said control data generating means includes a circuit for generating a masking signal to mask said luminance signal corresponding to a picture displayed in the upper and lower parts of said display means; and a detector circuit for detecting said average brightness level while said luminance signal is not masked and holding the last-detected average brightness level while said luminance signal is masked.

17. A video circuit comprising:

displaying means for displaying a picture on the basis of a video signal;

means for determining an average brightness level of the luminance signal separated from said video signal and generating control data for correctively controlling the brightness of said picture displayed on said display means in accordance with the average brightness level thus determined;

means for generating control data for correctively controlling the saturation of said picture displayed on said display means in accordance with the average brightness level; and a video signal processing circuit for correctively controlling the brightness and saturation of said picture on the basis of said two control data wherein said control data generating means includes means for determining multiple number of average brightness levels in one field and producing an average value per field by further averaging said average brightness levels;

means for determining an average value of multiple number of fields by taking an average value from the respective average values per field of multiple number of successive fields;

means for comparing the difference between said average value per field and said average value of multiple number of fields with a predetermined value; and means for selecting either said average value per field or said average value of multiple number of fields as data for generating said two control data in accordance with the result of comparison.

18. A video circuit comprising:

displaying means for displaying a picture on the basis of a video signal;

means for determining an average brightness level of the luminance signal separated from said video signal and generating control data for correctively controlling the brightness of said picture displayed on said display means in accordance with the average brightness level thus determined;

means for generating control data for correctively controlling the saturation of said picture displayed on said display means in accordance with the average brightness level; and a video signal processing circuit for correctively controlling the brightness and saturation of said picture on the basis of said two control data wherein said control data generating means includes means for determining multiple number average brightness levels in one field and producing an average value per field by further averaging said average brightness levels;

means for determining an average value of multiple number of fields by taking an average value from the respective average values per field of multiple number of successive fields;

means for comparing the difference between said average value per field and said average value of multiple number of fields within a first predetermined value;

means for producing a selected value by selecting either said average value per field or said average value of multiple number of fields in accordance with the result of comparison;

means for producing a selected average value by averaging said selected values of multiple number of successive fields;

means for comparing the difference between said average value per field and said selected average value with a second predetermined value; and means for selecting either said average value per field or said selected average value as data for generating said two control data according to the result of comparison.

19. A video circuit according to claim 13, wherein said control data generating means includes;

means for transmitting said two control data from said control data generating means to said video signal processing circuit during the vertical blanking period.

20. A method for controlling a display comprising the steps of:

(a) displaying a picture in response to a video signal;

(b) determining an average brightness level of a luminance signal separated from said video signal;

(c) generating control data as a function of the average brightness level, wherein the control data is generated to maintain the previous average brightness of the picture when the average brightness level is out of a predetermined range;

(d) controlling a lightness variable of the display in response to the control data generated in step (c).

21. The method of claim 20, wherein step (d) includes controlling the brightness of the display in response to the generated control data.

22. The method of claim 20, wherein step (d) includes controlling the saturation of the display in response to the generated control data.

23. The method of claim 20, wherein
step (d) includes controlling the brightness and saturation of the display in response to the generated control data.

24. A method for controlling a display comprising the steps of:
   (a) displaying a picture in response to a video signal;
   (b) masking a luminance signal, separated from said video signal for a predetermined period of time of one field period;
   (c) determining an average brightness level of said luminance signal when said luminance signal is not masked and holding the last-determined average brightness level when said luminance signal is masked;
   (d) generating control data as a function of the average brightness level determined in step (c);
   (e) controlling a lightness variable of the display in response to the generated control data.

25. The method of claim 24, wherein
step (e) includes controlling the brightness of the display in response to the generated control data.

26. The method of claim 24, wherein
step (e) includes controlling the saturation of the display in response to the generated control data.

27. The method of claim 24, wherein
step (e) includes controlling the brightness and saturation of the display in response to the generated control data.

28. A method for controlling a display comprising the steps of:
   (a) displaying a picture on a display in response to a video signal;
   (b) generating a masking signal to mask a luminance signal separated from said video signal, corresponding to the picture displayed in the upper and lower parts of the display;
   (c) determining an average brightness level of said luminance signal when said luminance signal is not masked and holding the last-determined average brightness level when said luminance signal is masked;
   (d) generating control data as a function of the average brightness level determined in step (c); and
   (e) controlling a lightness variable of the display in response to the generated control data.

29. The method of claim 28, wherein
step (e) includes controlling the brightness of the display in response to the generated control data.

30. The method of claim 28, wherein
step (e) includes controlling the saturation of the display in response to the generated control data.

31. The method of claim 28, wherein
step (e) includes controlling the brightness and saturation of the display in response to the generated control data.

32. A method for controlling a display comprising the steps of:
   (a) displaying a picture in response to a video signal;
   (b) for a first number of successive fields, including an individual field, determining a second number of average brightness levels of each field;
   (c) for each of said first number of fields, producing a respective field average value by averaging the respective second number of average brightness levels;
   (d) calculating an overall average as a function of each of said field average value of said first number of successive fields;
   (e) comparing a first predetermined value with a difference between said overall average and an average related to the field average of said individual field;
   (f) generating control data as a function of either the overall average or the field average of said individual field in response to the comparison of step (e); and
   (g) controlling a lightness variable of the display in response to said generated control data.

33. The method of claim 32 wherein
step (d) includes calculating an overall average by averaging respective field averages of said first number of successive fields.

34. The method of claim 33, wherein
step (g) includes controlling the brightness of the display in response to the generated control data.

35. The method of claim 33, wherein
step (g) includes controlling the saturation of the display in response to the generated control data.

36. The method of claim 33, wherein
step (g) includes controlling the brightness and saturation of the display in response to the generated control data.

37. The method of claim 32, wherein step (d) includes:
   (d1) calculating a first group average by averaging respective field average of said first number of successive fields;
   (d2) for each of said first number of successive fields, creating a selected field average by
   (d2a) comparing a second predetermined value and a difference between said first group average and each of said field averages of said first number of successive fields;
   (d2b) selecting either said field average or said first group average in response to the comparison in step (d2a);
   (d3) calculating an overall average by averaging the selected field averages of each of the first number of successive fields.

38. The method of claim 37, wherein
step (e) includes comparing the first predetermined value with the difference between the overall average and a selected average corresponding to said individual field; and
step (f) includes generating control data as a function of either the overall average or the selected average of said individual field in response to the comparison in step (e).

39. The method of claim 38, wherein
step (g) includes controlling the brightness of the display in response to the generated control data.

40. The method of claim 38, wherein
step (g) includes controlling the saturation of the display in response to the generated control data.

41. The method of claim 38, wherein
step (g) includes controlling the brightness and saturation of the display in :response to the generated control data.

* * * * *